Nov. 18, 1969 B. H. FRANCE 3,479,530

SYSTEM FOR GATING DIFFERENTIAL OR SINGLE-ENDED SIGNALS

Filed May 24, 1968 2 Sheets-Sheet 1

INVENTOR
BERNARD H. FRANCE

BY Hurvitz & Rose

ATTORNEYS

SYSTEM FOR GATING DIFFERENTIAL OR SINGLE-ENDED SIGNALS

Filed May 24, 1968 2 Sheets-Sheet 2

United States Patent Office 3,479,530
Patented Nov. 18, 1969

3,479,530
SYSTEM FOR GATING DIFFERENTIAL OR SINGLE-ENDED SIGNALS

Bernard H. France, Melbourne, Fla., assignor to Radiation Incorporated, Melbourne, Fla., a corporation of Florida Continuation of application Ser. No. 259,870, Feb. 20, 1963. This application May 24, 1968, Ser. No. 734,175
Int. Cl. H03k 17/60
U.S. Cl. 307—254 11 Claims

ABSTRACT OF THE DISCLOSURE

A signal gating circuit has a pair of signal translation paths, each containing a transistor of the same conductivity type as the transistor in the other path, and each having a respective drive path through which the transistors may be simultaneously driven from a normal cutoff state to a state of saturation. The drive paths are isolated from one another and each contains a further transistor operatively connected to the respective transistor in the associated signal path and of opposite conductivity type relative to the signal path transistors. Gating voltage supplied to the drive paths is effective to turn on the transistors therein, and as a result, to drive the signal path transistors into their saturation states. Equalization of the saturation drops of the signal path transistors is accomplished by adjusting the value of a variable resistance in one of the drive paths.

The present application is a continuation of my copending application Ser. No. 259,870, of the same title, filed Feb. 20, 1963, and now abandoned.

The present invention relates generally to transistorized switching circuits and more particularly to a switch employing a pair of balanced saturation drop transistors series connected with a load and a source wherein each of the balanced saturation drop transistors is activated by separate, isolated driving circuits.

Pairs of matched saturation drop transistors have been known for a number of years and have been found to be quite efficient since they approach to a very large degree the idealized switch, i.e. very large open and negligible short circuit impedances. The use of these circuits has been largely confined to single ended or transformer coupled differential sources and loads in the past, as distinguished from those of the direct coupled differential type, because the driving circuits for the switching transistors have usually required a common connection. The development of a single switch adapted for use with both types of circuits has not been attained because of the difficulty encountered with the differential design.

According to the present invention, a circuit capable of operating in either the single ended or differential mode is provided. The driving circuits for the balanced saturation drop transistors are completely isolated from each other. Each of these circuits includes an inexpensive transistor switch, the emitter-collector path of which gates a saturating potential source between the base and collector of the respective saturating transistor. The emitter to collector path of the inexpensive transistor gates the saturating potential when the same potential forward biases its base. Hence, switching efficiency is relatively high since a single pulsating voltage serves both as the source to open the driving gate and as the source to drive the matched transistors.

It is a feature of the present invention that there is zero voltage offset and drift between load and source so that all of the voltage developed by the source is faithfully coupled to the load without any bias level shifting. Zero off-set is accomplished by utilizing a variable impedance in the collector-base circuit of at least one saturating transistor and adjusting its value until the two saturation drops are equal and opposite. Accordingly, there is no signal voltage drop through the variable impedance because it is connected in the drive circuit in such a manner as to preclude the flow of signal current through it. Zero drift is attained because there are no capacitors in the driver and saturating transistor circuits to build up charges in response to the pulsating currents.

A further feature of the present invention, according to one of its embodiments, is that a single resistor serves both as the base current limiter for the driver transistor and as the impedance to control the voltage drop for the saturating transistor. This, of course, is highly desirable because the number of components, hence equipment cost is decreased.

It is, accordingly, an object of the present invention to provide a new and improved transistor switch circuit.

Another object of the invention is to provide a matched saturation drop transistorized switch adapted for use either with single ended or differential circuits.

An additional object of the present invention is to provide a matched saturation drop transistorized switch wherein the driving circuits for the two transistors in the switch are isolated from each other so that only one inexpensive, matched pair of transistors is necessary for either single ended or differential circuits.

A further object of the present invention is to provide a matched saturation drop transistorized switch having zero drift and bias offset between input and output and a small number of components so that cost is minimized.

The above and still further objects, features and advantages of the present invention will become apparent upon consideration of the following detailed description of several specific embodiments thereof, especially when taken in conjunction with the accompanying drawings, wherein.

Figure 1:
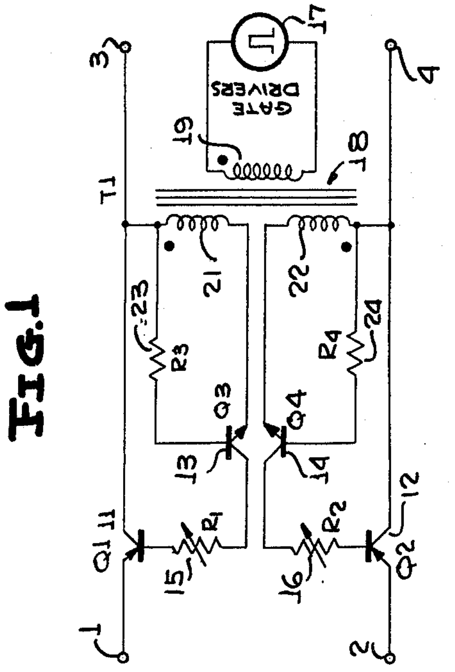
FIGURE 1 is a circuit diagram of one embodiment of the present invention.

Reference is now made to FIGURE 1 of the drawings wherein the reference numerals 11 and 12 denote PNP switching transistors connected in series circuit with each other, a signal source and a load, as will be seen infra by reference to FIGURES 2–5. Transistors 11 and 12 are of the inexpensive matched saturation drop type that can be adjusted for equal and opposite saturation voltage drops through control of their base currents. With sufficiently large negative currents supplied to the bases of transistors 11 and 12, they will be driven into saturation and have equal saturation voltage drops between their collectors and emitters even though the base currents are unequal to a certain extent.

An inexpensive driving source for switching transistors 11 and 12 is provided by unmatched NPN transistors 13 and 14. Transistors 13 and 14 have their collectors connected to the bases of transistors 11 and 12 via variable resistances 15 and 16, respectively. Resistors 15 and 16 are adjusted to control the base currents supplied to transistors 11 and 12 and provide equal saturation voltage drops through the switching transistors.

To switch transistors 13 and 14 into a conductive state, pulsating voltage source 17 is coupled between their bases and emitters via transformer 18. The primary winding 19 of transformer 18 is connected directly to source 17 while secondaries 21 and 22 are wound and interconnected in such a manner as to apply like voltages between the emitters and bases of transistors 13 and 14. Connected between one end of each of the secondary windings 21 and 22 and the bases of transistors 13 and 14 are separate current limiting resistors 23 and 24.

In operation, transistors 11 and 12 are normally cut off because no current is coupled to their bases, due to the open circuited condition of transistors 13 and 14. Hence, terminals 1 and 3 are disconnected from each other, as are terminals 2 and 4.

In response to the leading edge of the positive going pulses from source 17, the base to emitter junction of transistor 13 is forward biased. This enables the positive voltage now coupled across winding 21 to be applied between the collector and base of transistor 11. As is well known, the application of a positive voltage of sufficient amplitude to the collector of a PNP transistor relative to its base results in the establishment of a constant negative voltage between its emitter and collector. In the circuit of FIGURE 1, therefore, the collector of transistor 11 is positive relative to the emitter by a constant, predetermined amount, termed the saturation drop. The voltage at terminal 3 follows the variations of a signal voltage applied to terminal 1, and differs therefrom only by the saturation drop through transistor 11 since the transistor collector to emitter path may be considered as being of negligible impedance. It is imperative that transistors 11 and 13 be of opposite conductivity types so that in the non-conducting state no forward diode path exists between the source terminal 1 and load terminal 3 (i.e., through transistor 11 emitter-base, resistor 15, transistor 13 collector-base and resistor 23) to enable the circuit to function properly. In addition, the necessary base to collector voltage for transistor 11 to establish saturation cannot be achieved simultaneously with switching on of transistor 13.

As the voltage at the base of transistor 13 decreases due to the decoupling effect between the primary and secondary windings of transformer 18 for the low frequency components of source 17 or the occurrence of the negative going trailing edge of the source, transistor 13 is cut off. This prevents the further flow of base current in transistor 11 which is accordingly driven to cut-off, to open circuit the emitter-collector path between terminals 1 and 3.

In synchronism with and in the same manner as the operation of transistor 11, transistor 12 is alternately driven into its open and short circuit conditions via the switch constituted by transistor 14. Hence, the saturation voltage drops across transistors 11 and 12 are always equal and the two transistors are open circuited at the same time. Thus, if a current path exists between terminals 3 and 4 for a signal potential between terminals 1 and 2, the saturation voltage drop through transistors 11 and 12 are equal and opposite for the resulting signal current. In consequence, the total net drop for the signal current through transistors 11 and 12 is zero so that there is no voltage offset between input and output due to biasing sources or transistor drops.

The circuit is also highly advantageous because there is substantially no drift in the zero bias level between terminals 1 and 2 through transistors 11 and 12. This is because switching transistors 11 and 12 are D.C. coupled between terminals 1 and 2, as are their driving circuits including transistors 13 and 14. Hence, there are no capacitors to build up residual voltages and produce offset either in the switching or driving circuits.

A feature of the circuit is that no D.C. biasing source for driving transistors 13 and 14 is required because their energizing potential is derived from source 17. As a result, there are no current sources to cause possible spurious operation of the transistors when the switch is supposed to be gated off. Also, there is no common potential between the two driving circuits and gating transistors 11 and 12, the possibility of cross talk between the circuits including transistors 13 and 14 is completely obviated. Because the drive circuits are completely isolated, a differential or single ended gate can be obtained as is seen by reference to the following figures.

Figure 2:
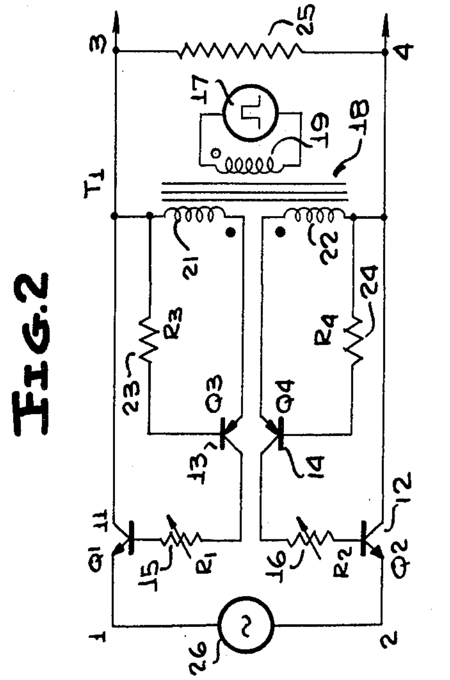
FIGURE 2 is a circuit diagram of another embodiment of the present invention illustrating how the circuit is connected in the differential gate configuration.

Reference is now made to FIGURE 2 wherein a differential output is derived between terminals 3 and 4 across load 25 in response to signal source 26. This circuit is substantially like that of FIGURE 1 between the input and output terminals except that the conductivity of the transistors is reversed. In consequence, transformer 18 is connected so that a positive voltage from source 17 couples a positive voltage to the emitters of transistors 13 and 14.

In response to the positive going wavefront from source 17, transistors 13 and 14 are forward biased to establish a current path between the emitters and collectors. In consequence, the negative potentials coupled across secondary windings 21 and 22 are applied between the bases and collectors of transistors 11 and 12. These potentials are of sufficient magnitude to drive transistors 11 and 12 into a low impedance saturation state with constant voltage drops being established between their emitters and collectors.

If it is assumed that terminal 1 is driven positive relative to terminal 2 by signal source 26 at the time transistors 11 and 12 are driven into saturation, the resulting current flows through transistor 11 to load 25 with a saturation voltage drop of $+V_{ce}$ across transistor 11. The current flows through load 25 and transistor 12 back to the other side of source 26 at terminal 2. In passing through transistor 12 the signal current encounters a negative saturation drop $-V_{ce}$. Hence, the total net voltage drop due to the two switching transistors in the series circuit between source 26 and load 25 is zero and all of the voltage from the source is coupled across the load so that the difference in voltage across terminals 3 and 4 equals the voltage of source 26.

Figure 3:
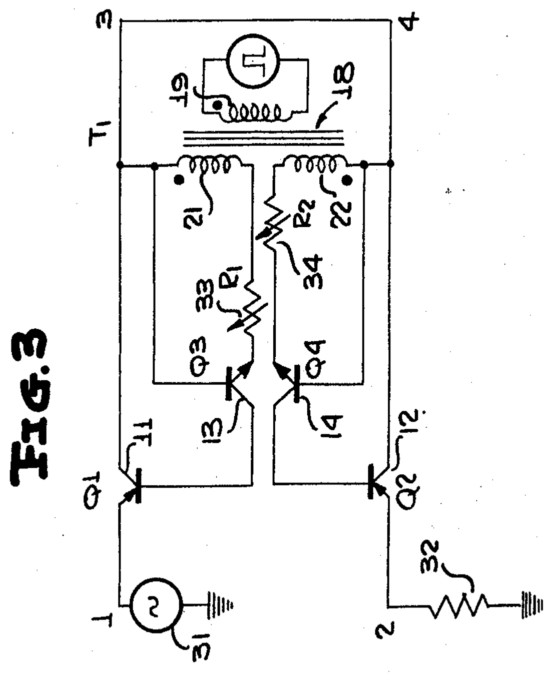
FIGURE 3 is an illustration of a further embodiment wherein the circuit is connected according to the single ended gate configuration.

Reference is now made to FIGURE 3 of the drawings wherein a single ended source 31 has one of its ends connected to terminal 1, its other end being connected to ground. Source 31 is switched to load 32, coupled between terminal 2 and ground, through PNP transistors 11 and 12, the collectors of which are short circuited together, in substantially the same manner discussed supra for FIGURE 2. As in FIGURE 2, the saturation drops through transistors 11 and 12 are equal and opposite so that all of the voltage from source 31 appears across load 32.

The circuit of FIGURE 3 differs from that of FIGURE 2, however, in that a single resistor is connected in the driving circuit of matched switching transistors 11 and 12. Variable resistors 33 and 34, which serve as current limiters for driver transistors 13 and 14, respectively, and as the means to insure equal and opposite saturation drops across transistors 11 and 12, are connected between the emitters of the driver transistors and the undotted ends of secondary windings 21 and 22. It is to be understood that this configuration, employing a minimum of components, is possible only if the maximum base current for transistors 13 and 14 is compatible with the current coupled to the bases of transistors 11 and 12 to effect saturation.

Figure 4:
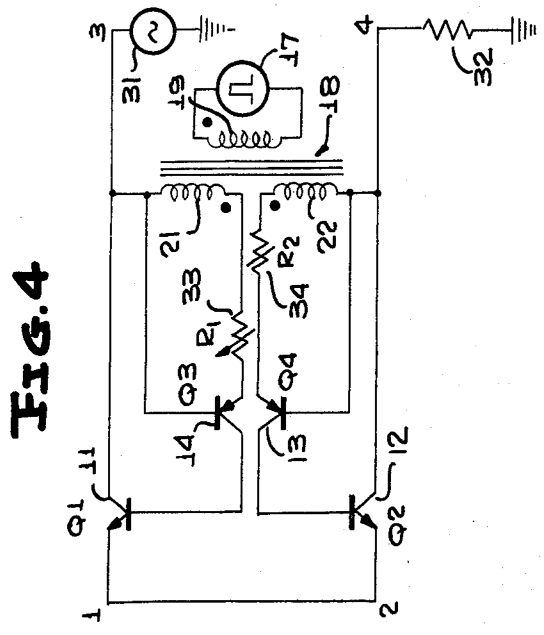
FIGURE 4 is a circuit diagram of an additional embodiment in which a second type of single ended gate is shown.

To illustrate the manner in which the circuit of FIGURE 3 is interconnected if the conductivity type of the transistors is reversed and if a single ended source is connected to terminal 3, reference is made to FIGURE 4. The internal switch connections are substantially like that illustrated by FIGURE 3 except for the reversed connections of the secondary windings 21 and 22 of transformer 18. In consequence, the operation of the switch is substantially like that discussed for FIGURE 2. To indicate the universality of the circuit, signal source 31 is connected between ground and the collector of transistor 11 while load 32 is connected to ground from the collector electrode of transistor 12. The emitters of transistors 11 and 12 are directly connected together to complete the current path from source 31 to load 32 via the switch.

Figure 5:
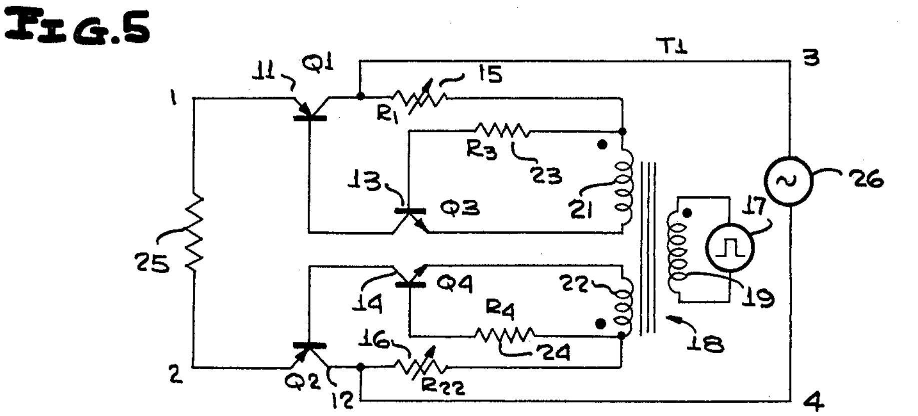
FIGURE 5 is a circuit diagram illustrating still a further mode of connecting the components of the present invention.

To illustrate a still further embodiment of the invention, reference is now made to FIGURE 5 of the drawings. This embodiment is substantially like that of FIGURE 1 when the latter is connected in a differential configuration, except that variable resistors 15 and 16, which control the saturation drops of transistors 11 and 12, are connected directly to the respective transistor collectors. Because of this, source 26, connected between terminals 3 and 4, is coupled directly to the junction of the collectors of transistors 11 and 12 with resistors 15 and 16, respectively. Lead 25 is connected between the emitters of transistors 11 and 12 so that the voltage difference across its terminals equals that of source 26 when the switched transistors 11 and 12 are driven into saturation.

Figure 6:
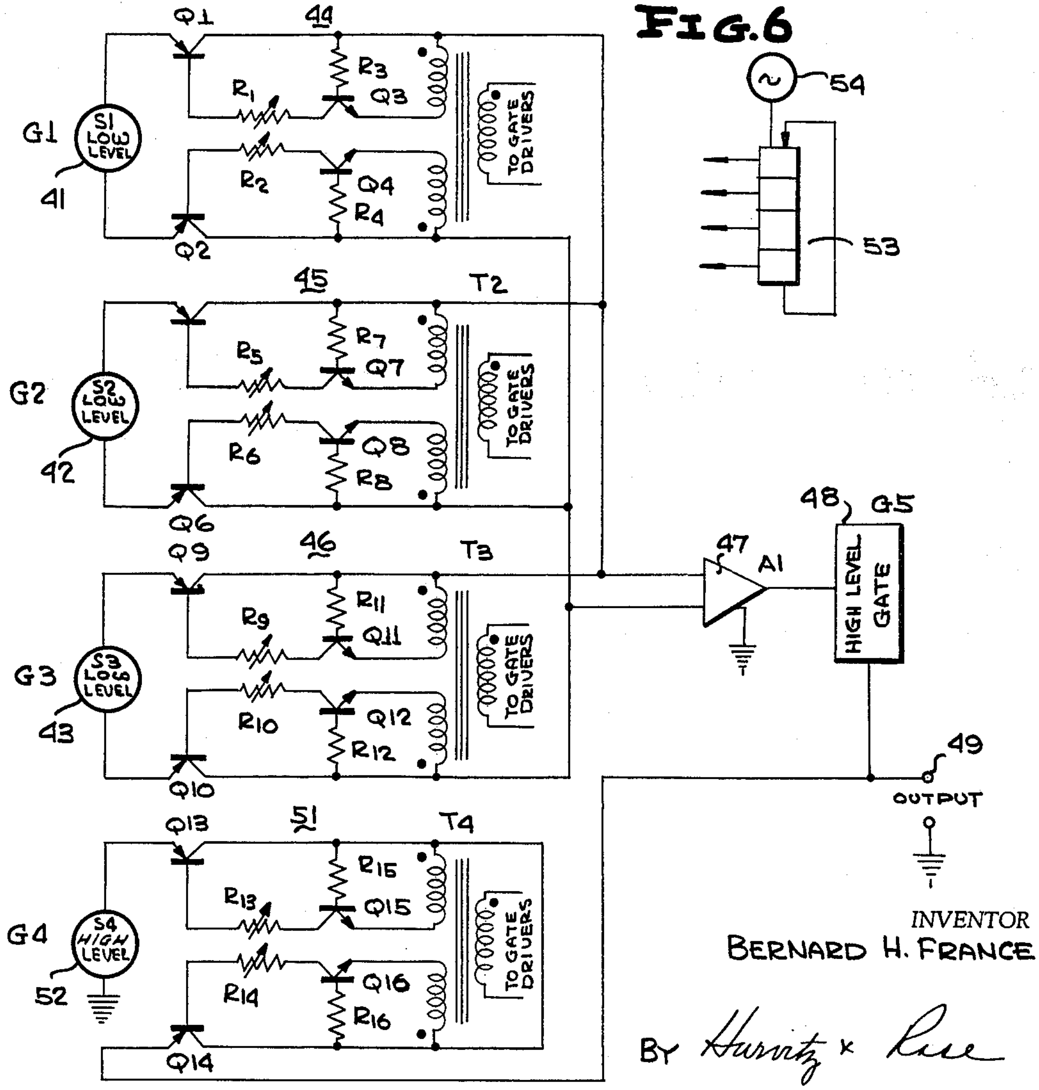
FIGURE 6 is a circuit diagram illustrating the manner in which the various circuits are interconnected to form a complete time division multiplexing circuit.

The manner in which the circuit of the present invention is utilized to provide a time division multiplexed signal for low and high level signals is seen by referring to FIGURE 6. Three low level, 5–100 millivolt, signal sources 41–43 are coupled to differential switches 44–46, respectively, of the type illustrated by FIGURES 1 and 2. The differential outputs of switches 44–46 are coupled between the input terminals of differential amplifier 47 which derives a voltage of sufficient amplitude between ground and its output signal terminal to drive high level single ended gate 48, which may be of the type illustrated by FIGURE 3 or 4. The single ended output signal of high level gate 48, generally greater than 100 millivolt in magnitude, is coupled between ground and signal output terminal 49.

The output signal from gate 48 is derived on a common lead with the output of single ended gate 51, which is of the type illustrated by FIGURE 3. Gate 51 is responsive to high level, greater than 100 millivolts, signal source 52, having one of its ends grounded. Thus, the signal on lead 49 is a pulse amplitude modulated time division, multiplexed signal having an amplitude at least equal to 100 millivolts.

To control the sequential switching of sources 41–43 and 52 to lead 49, feedback shift register 53 having four stages is provided. Shift register 53 is driven by oscillator 54 so that an output is sequentially derived from each of its stages. Each of the stages is coupled to the primary winding of the driving transformer of switches 44–46 and 51, respectively. In addition, the first three stages are connected in parallel to the driving transformer of high level gate 48. Thereby, output signals indicative of the three low level sources 41–43 are coupled from gate 48 to terminal 49 in the correct phase relation relative to coupling of signal source 52 by gate 51.

What is claimed is:

1. A gating circuit for selectively passing signal from a signal source to a utilization circuit, said gating circuit comprising first and second transistors, each of said transistors having a base electrode, an emitter electrode, and a collector electrode;

means for selectively supplying base drive current simultaneously to both of said transistors for saturation thereof, to thereby gate signal applied to said transistors through the respective emitter-collector paths thereof, said current supplying means including a pair of driving circuits each coupled to a different respective transistor of said first and second transistors, said driving circuits being electrically isolated from one another to prevent signal interaction therebetween, means for applying gating signal simultaneously to both of said driving circuits, and separate switch means in each of said driving circuits responsive to gating signal applied to the respective driving circuit for supplying said base drive current to the respective transistor of said first and second transistors, each of said switch means comprising a respective further transistor of opposite conductivity type relative to the respective transistor of said first and second transistors; and means in at least one of said driving circuits for controlling the base drive current of the respective transistor of said first and second transistors to equalize the saturation drops of the emitter-collector paths of said first and second transistors.

2. The invention according to claim 1 wherein said means for applying gating signal to said driving circuits includes a primary winding; and wherein each of said driving circuits includes a respective secondary winding inductively coupled to said primary winding, each of said secondary windings connected to the base electrode of said respective further transistor and to an electrode other than the base electrode of the respective transistor of said first and second transistors via one end of the respective secondary winding, and connected to the emitter electrode of said respective further transistor via the other end of the respective secondary winding.

3. The invention according to claim 1 wherein said drive current controlling means comprises a variable impedance.

4. A circuit for gating single-ended or differential signals from a source thereof to a load, comprising first and second transistors each having base, emitter and collector electrodes; a drive circuit for isolating said transistors while supplying base drive current thereto to selectively and simultaneously saturate said transistors and thereby gate signal through the respective emitter-collector paths thereof; and means for controlling the base drive current of at least one of said transistors to equalize the saturation drops of the emitter-collector paths of said transistors; wherein said drive circuit includes a source of gating voltage, a pair of transistors of opposite conductivity type relative to said first and second transistors, each of said pair of transistors having base, emitter and collector electrodes, a transformer having a primary winding and a pair of secondary windings, said voltage source connected across said primary winding, means coupling the ends of each of said secondary windings to the base and emitter electrodes of respective ones of said pair of transistors, means coupling one end of each of said secondary windings to the collector electrode of respective ones of said first and second transistors, and means coupling the collector electrode of each of said pair of transistors to the base electrode of respective ones of said first and second transistors.

5. The combination according to claim 3 wherein said drive current controlling means comprises a variable impedance in one of said coupling means.

6. A signal gating circuit, comprising a pair of signal translation paths, at least one transistor connected in each of said signal paths, the transistor in each path having states of saturation and cutoff, when appropriately biased, whereby to respectively permit and prevent passage of signal through the respective path in which that transistor is connected, each transistor being of the same conductivity type;

means for selectively driving the transistors in both said signal paths into a state of saturation or of cutoff while electrically isolating the drive path for one transistor from that for the other to prevent signal interaction therebetween, said driving means including a pair of drive paths each coupled to the transistor in the respective signal path, means for applying gating voltage simultaneously to both of said drive paths, and means in each of said drive paths responsive to said gating voltage applied thereto for selectively supplying said gating voltage to the transistor in the respective signal path while blocking passage of signal from said respective signal path through that drive path, each of the last-named means comprising a further transistor of opposite conductivity type relative to the transistor in the respective signal path; and means, in said driving means, for adjusting the saturation drop of at least one of the transistors to equalize the saturation drops of said pair of signal paths.

7. The invention according to claim 5 wherein said driving means includes a transformer having a primary winding and a pair of secondary windings, and wherein said means for applying gating voltage to said drive paths includes said primary winding, and wherein each of said drive paths includes one of said secondary windings for applying biasing voltage to the respective one of said further transistors.

8. The invention according to claim 5 wherein said adjusting means comprises a variable resistance in one of said drive paths.

9. The invention according to claim 6 wherein said adjusting means includes a variable resistance in each of said drive paths.

10. The invention according to claim 6 wherein a source of signal to be gated is connected across one pair of common ends of said signal paths for differentially supplying signal thereto, and wherein a loading circuit is connected across the other pair of common ends of said signal paths.

11. The invention according to claim 6 wherein a source of signal to be gated is connected to one end of one of said signal paths, a load circuit is connected to a corresponding end of the other of said signal paths, and the other ends of said signal paths are connected together.

References Cited

UNITED STATES PATENTS

| | | | |
|---|---|---|---|
| 2,836,734 | 5/1958 | Cichanowicz | 307—243 X |
| 2,891,171 | 6/1959 | Shockley | 307—254 X |
| 3,089,963 | 5/1963 | Djorup | 307—254 X |

DONALD D. FORRER, Primary Examiner

U.S. Cl. X.R.

307—241, 243, 255, 313